United States Patent
Stagg et al.

(10) Patent No.: US 11,968,441 B2
(45) Date of Patent: Apr. 23, 2024

(54) TRUE WIRELESS CAMERA ASSEMBLIES

(71) Applicant: ZEBRA TECHNOLOGIES CORPORATION, Lincolnshire, IL (US)

(72) Inventors: Adrian J. Stagg, Belfountain (CA); Dmitri Katsif, Vaughan (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/503,514

(22) Filed: Oct. 18, 2021

(65) Prior Publication Data

US 2022/0345617 A1 Oct. 27, 2022

Related U.S. Application Data

(60) Provisional application No. 63/177,766, filed on Apr. 21, 2021.

(51) Int. Cl.
*H04N 23/62* (2023.01)

(52) U.S. Cl.
CPC .................................. *H04N 23/62* (2023.01)

(58) Field of Classification Search
CPC .................................................. H04N 5/23216
See application file for complete search history.

(56) References Cited

U.S. PATENT DOCUMENTS

| | | | |
|---|---|---|---|
| 2012/0163305 A1* | 6/2012 | Nimbalker | H04W 52/0206 370/329 |
| 2017/0094134 A1* | 3/2017 | Lunn | H04L 12/282 |
| 2017/0147841 A1* | 5/2017 | Stagg | G06K 7/10405 |
| 2018/0025196 A1* | 1/2018 | Todeschini | G06K 7/10792 235/472.01 |
| 2022/0223017 A1* | 7/2022 | Wong | H04N 5/23218 |

* cited by examiner

*Primary Examiner* — Christopher K Peterson

(57) ABSTRACT

A camera assembly includes: a camera having a field of view (FOV); an energy storage device; an energy collector, configured to charge the energy storage device; a wireless communications interface; a controller configured to: (i) detect a capture initiation condition; (ii) in response to detecting the capture initiation condition, control the camera to capture an image; and (iii) control the wireless communications interface to transmit the image; and a housing supporting the camera, the energy storage device, the energy collector, the wireless communications interface, and the controller; the housing configured for coupling to a first support structure to direct the FOV of the camera towards a second support structure supporting a plurality of items.

17 Claims, 6 Drawing Sheets

TRUE WIRELESS CAMERA ASSEMBLIES

CROSS-REFERENCE TO RELATED APPLICATIONS

This application claims priority to U.S. Provisional Patent Application No. 63/177,766, filed Apr. 21, 2021, the contents of which is incorporated herein by reference.

BACKGROUND

Certain facilities, such as retail facilities (e.g. grocers, apparel stores, or the like) include a wide variety of items disposed on support structures such as shelves, for retrieval by customers, staff members, and the like. Managing inventory in such facilities may involve monitoring item status, e.g., identifying items that are misplaced, out of stock, or the like. The size of the facilities, number of distinct item types disposed therein, and/or variability in the placement and stock levels of the items, complicates efforts to automate item status monitoring.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
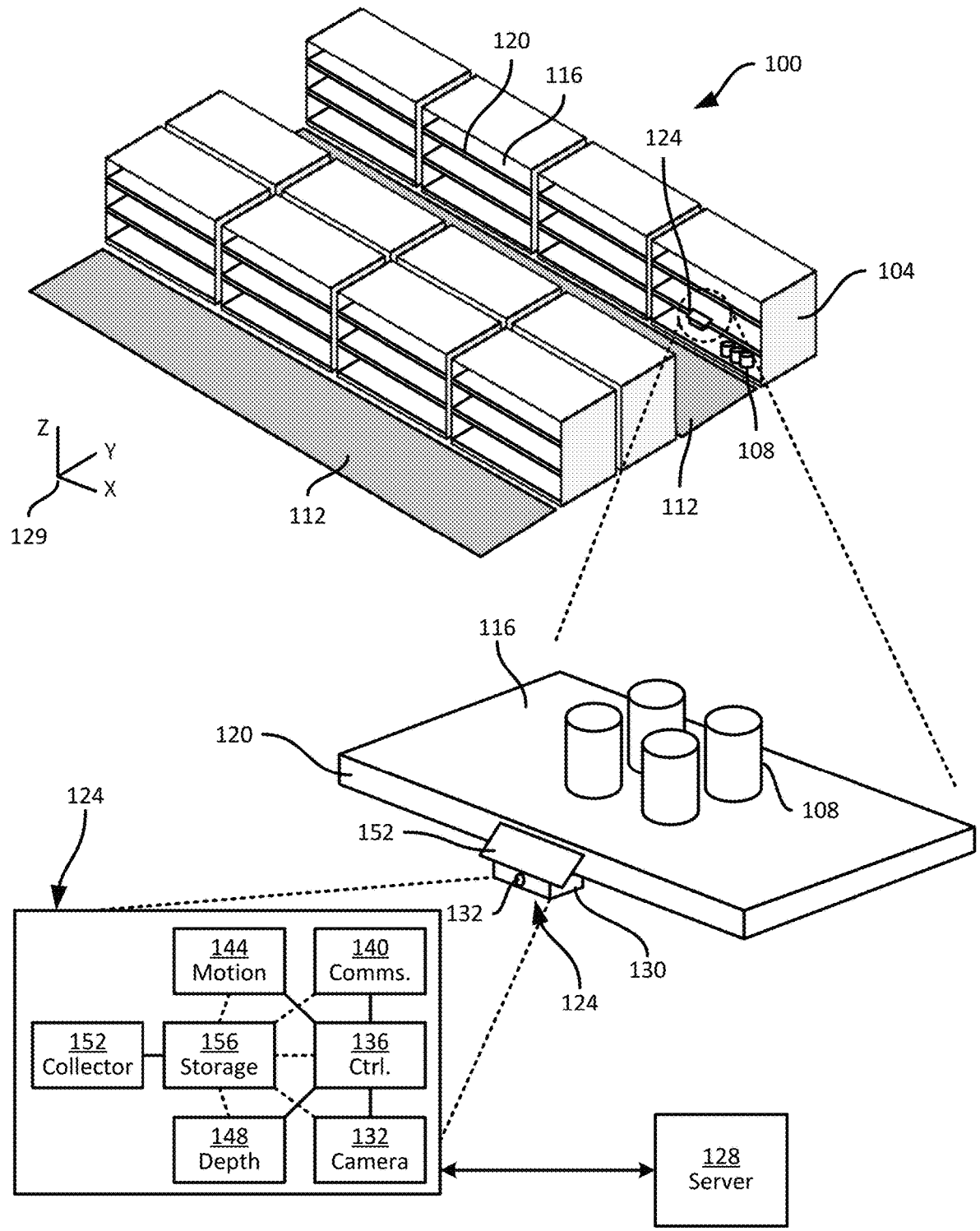
FIG. 1 is a diagram illustrating an inventory monitoring system.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a camera assembly including: a camera having a field of view (FOV); an energy storage device; an energy collector, configured to charge the energy storage device; a wireless communications interface; a controller configured to: (i) detect a capture initiation condition; (ii) in response to detecting the capture initiation condition, control the camera to capture an image; and (iii) control the wireless communications interface to transmit the image; and a housing supporting the camera, the energy storage device, the energy collector, the wireless communications interface, and the controller; the housing configured for coupling to a first support structure to direct the FOV of the camera towards a second support structure supporting a plurality of items.

Additional examples disclosed herein are directed to a method in a camera assembly, comprising: generating electrical power via an energy collector of the camera assembly; charging an energy storage device of the camera assembly with the electrical power; a wireless communications interface; at a controller of the camera assembly: detecting a capture initiation condition; in response to detecting the capture initiation condition, controlling a camera of the camera assembly to capture an image; control a wireless communications interface of the assembly to transmit the image.

FIG. 1 illustrates an inventory monitoring system 100 deployed in an interior of a facility, such as a retail facility (e.g., a grocer). The facility includes a plurality of support structures 104 carrying items 108. In the illustrated example, the support structures 104 include shelf modules, e.g., arranged in sets forming aisles 112. FIG. 1, specifically, illustrates two aisles 112, with a first aisle 112 defined between two sets of four modules arranged in a line, and a second aisle 112 defined adjacent to another set of four modules. As will be apparent, the facility can have a wide variety of layouts other than the example layout shown in FIG. 1.

The support structures 104 can include shelves, pegboards, and the like, to support the items 108 thereon. As shown in FIG. 1, for example, each module 104 can have one or more support surfaces 116 (e.g., shelves) terminating in shelf edges 120, which face into the corresponding aisle 112. A shelf edge 120, as will be apparent to those skilled in the art, is a surface bounded by adjacent surfaces having different angles of inclination. In the example illustrated in FIG. 1, each shelf edge 120 is at an angle of about ninety degrees relative to the corresponding support surface 116 above that shelf edge 120 and the underside (not shown) of the support surface 116. In other examples, the angles between a shelf edge 120 and adjacent surfaces is more or less than ninety degrees.

As seen in FIG. 1, the support surfaces 116 are accessible from the aisles 112 into which the shelf edges 120 face. The support surfaces 116 carry the items 108, which can include any of a wide variety of objects, such as products for purchase by customers in the facility, for retrieval by staff members in the facility, and the like. The shelf edges 120 can carry labels containing information such as prices for the items 108.

The items 108 may be disposed on the support structures 104 in accordance with a planogram or other map generated for the facility. Compliance with such mapping information may include assessing the status of the items 108, e.g. to identify items 108 that are misplaced, items 108 that are out of stock or in low stock, incorrectly labelled items 108, and the like.

To assist in assessing item status in the facility, the system 100 includes a plurality of camera assemblies 124, e.g. affixed to the support surfaces 116. The number and arrangement of camera assemblies 124 deployed in the facility can depend on the size of the facility, the distance between the modules 104 across an aisle 112, the properties of each camera assembly 124, and the like, as will be apparent in the discussion below. In some examples, e.g. for modules 104 with a width of about four feet and a height of about seven feet, each module 104 can include three pairs of camera assemblies 124, each pair at a different height (e.g. on a different shelf edge 120), and each pair spaced apart along the module 104 to fully capture an opposing module 104. A facility may therefore include several hundred or thousand camera assemblies 124, in some deployments.

In general, each camera assembly 124 includes a camera controllable to capture images of objects within a field of view (FOV) thereof. Each camera assembly 124 is affixed to a module 104 on one side of an aisle 112 such that the FOV encompasses a portion of a module 104 across the aisle 112. In some examples, therefore, a first module 104 can be equipped with a sufficient number of camera assemblies 124 to yield images depicting substantially the entirety of a second module 104 across the aisle 112 (which itself also carries a suitable number of camera assemblies 124 to fully image the first module).

The camera assemblies 124, in other words, enable the collection of images depicting at least selected portions of the support structures 104. Those images can be processed, e.g. by a server 128, to detect the items 108, to detect gaps between the items 108, and the like. The server 128 can therefore generate status information for the items 108 based on the images, and can generate notifications based on such status information, e.g. enabling staff in the facility to restock items 108, correct labels, and the like. In general, such status information and alerts indicate locations of the relevant items 108, e.g., in a facility coordinate system 129. The server 128 can store calibration data, including locations and orientations of the camera assemblies 124 in the coordinate system 129. In some examples, the calibration data can also include intrinsic parameters associated with the camera assemblies 124, such as focal lengths and the like. The calibration data can enable the server 128 to register images from the camera assemblies 124 to a common frame of reference, and associate data derived from the images with particular locations within the facility.

As will be apparent, shelf modules such as the modules 104 shown in FIG. 1 often lack electrical power conduits and/or data conduits. Retrofitting the modules 104 with power and/or data conduits may be prohibitively costly, however. Therefore, the camera assemblies 124 include certain components and associated functionality enabling their deployment and use within the facility, in the absence of such power and data conduits. In addition, the camera assemblies 124 can perform various functionality to reduce the time and cost of maintaining the system 100.

An example camera assembly 124 is shown in detail in FIG. 1. In particular, the camera assembly 124 includes a housing 130 supporting other components of the assembly 124, and enabling the assembly 124 to be coupled to a support surface 116 of a first module, with an FOV of the camera assembly 124 facing another module 104. The assembly 124 also includes a camera 132 with the above-mentioned FOV. The assembly 124 further includes a controller 136, such as a low-power microcontroller or the like. The controller 136 can include an integrated non-transitory storage device such as a memory, and/or the assembly 124 can include a memory circuit (e.g. an integrated circuit element) distinct from the controller 136.

The assembly 124 also includes a wireless communications interface 140, enabling the assembly 124 to transmit the above-mentioned images and/or other data collected by the assembly 124, for direct or indirect delivery to the server 128. The interface 140 can therefore include any one of, or any suitable combination of, transceivers, antennas, and associated control hardware. The interface 140 can include one or more of a Wi-Fi interface, a Bluetooth interface (or other suitable short-range interface), a radio frequency identification (RFID) interface, or the like.

The assembly 124 can also, in some examples, include a motion sensor 144, such as one or more accelerometers, one or more mercury switches, and the like. As will be discussed in greater detail below, the motion sensor 144 can be employed to detect changes to the position and/or orientation of the assembly 124, which may necessitate remedial action by facility staff. The assembly 124 can also include a depth sensor 148, such as a rangefinder, an ultrasonic sensor, or the like. The depth sensor 148 is configured to sense distances from the sensor 148 itself to objects in the aisle 112, within the FOV of the camera 132. The controller 136 can use data from the depth sensor 148 to determine whether the FOV of the camera 132 is obstructed, e.g., prior to controlling the camera 132 to capture an image of the opposing module 104.

Electrical power for the operation of the above components is supplied by an energy collector 152. In the illustrated example, the energy collector 152 includes a photovoltaic panel configured to generate electrical power from ambient light in the facility. In other examples, the energy collector 152 includes one or more thermopiles, configured to generate electrical power from temperature gradients, e.g. for assemblies 124 installed in refrigerated aisles of the facility. In further examples, the energy collector can include one or more piezoelectric generators, e.g. disposed on the adjacent support surface 116 or on the floor in the aisle 112, configured to generate power from mechanical deformation imposed by placement or removal of the items 108, customers travelling through the aisle 112, and the like. In still further examples, the communications interface 140 can also act as an energy collection device, e.g. to harvest energy from one or more RFID readers disposed in the facility. The RFID readers can be configured, for example, to direct transmit beams at one or more assemblies 124 in sequence, to provide energy to the assemblies and/or retrieve data from the assemblies 124.

The above-noted energy collection mechanisms may generate electrical power at rates too small to power the controller 136, camera 132 and communications interface 140 directly. Therefore, the energy collector 152 is connected to an energy storage device 156, such as a supercapacitor, via one or more voltage regulators, charge controllers, or the like. The energy storage device 156 enables the collection of electrical power at low rates (e.g., too low to directly operate the assembly 124) and the accumulation of such electrical power until sufficient energy is available to complete an image capture and/or transmission. In general, therefore, the energy collector 152 generates electrical power, and charges the storage device 156. Electrical power can then be drawn from the energy storage device 156 to enable operation of the remaining components of the assembly 124.

Figure 2:
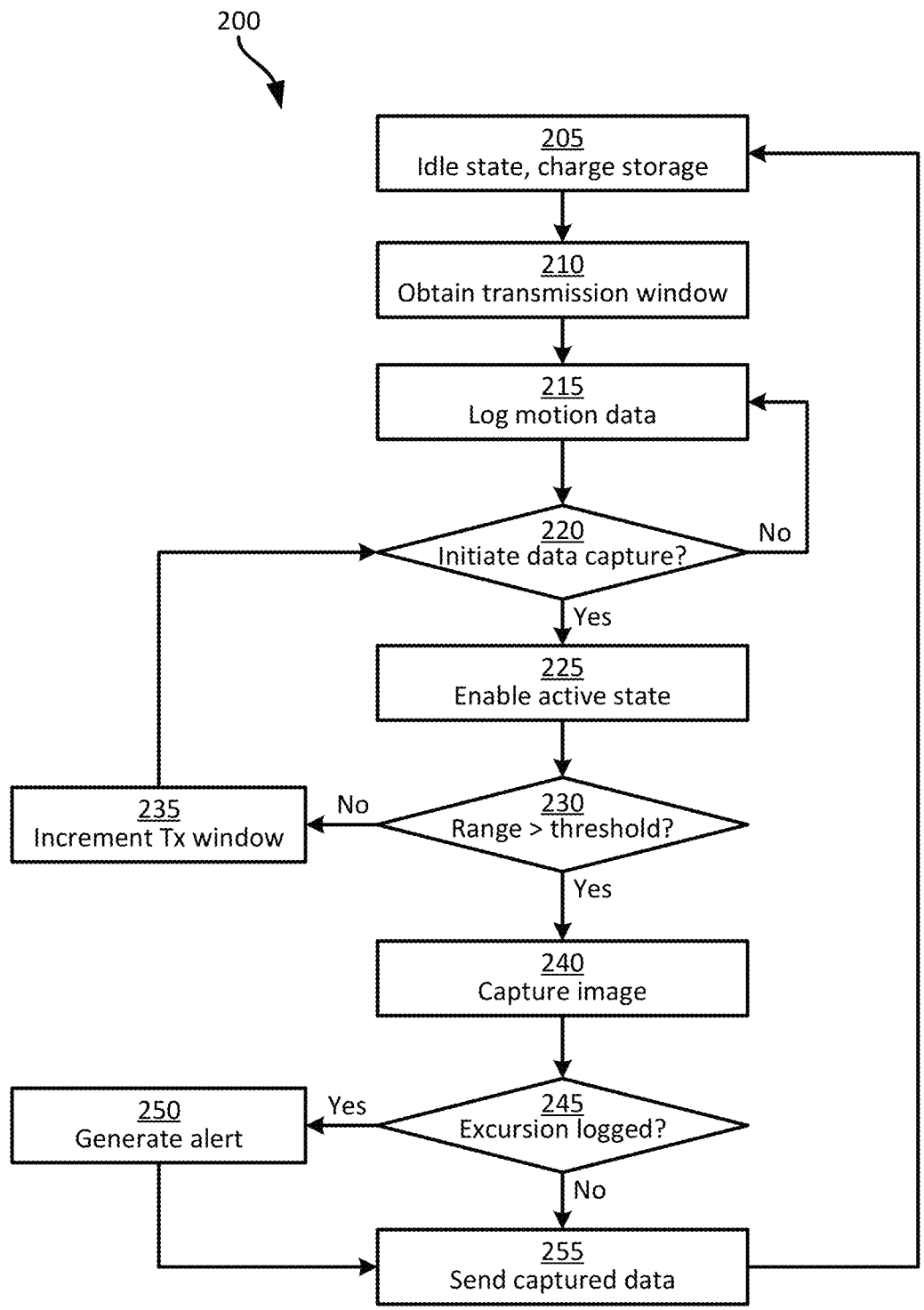
FIG. 2. is a flowchart of an inventory monitoring method.

Turning to FIG. 2, the operation of an example camera assembly 124 will be discussed in greater detail. In particular, FIG. 2 illustrates a method 200 of operating a camera assembly 124. The method 200 can be performed by the controller 136, e.g., via execution of computer-readable instructions stored at the controller and/or the above-mentioned memory.

At block 205, the controller 136 is configured to operate in an idle, or low-power state, while the energy storage device 156 is charged by the energy collector 152. In the low-power state, the controller 136 may disable certain functionality of the assembly 124, e.g. turning off the camera 132, communications interface 140, and depth sensor 148. In addition, the controller 136 itself may disable certain local functions, e.g., limited to monitoring a clock as well as output from the motion sensor 144. In some examples, the low-power state may permit the communications interface 140 to monitor for incoming transmissions. In general, in the low-power state, the assembly 124 consumes a small enough amount of power to enable charging of the energy storage device 156. That is, in the low-power state, the power consumed by the assembly 124 is exceeded (at least some of the time) by the power generated by the collector 152.

Periodically, the controller 136 is configured to transition to a second, higher-power state (in some examples, the second state may be one of multiple power states distinct from the low-power state), and control the camera 132 to capture an image, for transmission via the communications interface 140. Because the facility may contain a large number (e.g. hundreds or thousands) of individual camera assemblies 124, simultaneous transmission of images by all, or by a significant portion, of the assemblies 124 may lead to network congestion and/or interference with other wireless devices in the facility. Each assembly 124 therefore implements functionality to mitigate such congestion, while also limiting the need for inter-assembly coordination.

In particular, at block 210 the controller 136 can be configured to obtain a transmission window. The controller 136 can be configured to capture and transmit an image at a configurable frequency (e.g., once every six hours, although shorter and longer periods between captures are also contemplated). More generally, each assembly 124 in the facility may be configured with the same capture frequency. The transmission window defines at what point, within a given six-hour period (or any other suitable period, determined according to the above-mentioned frequency), the controller 136 will control the remaining components of the assembly 124 to capture and transmit an image. As will be apparent in the discussion below, the use of transmission windows serves to distribute image transmissions (and corresponding use of the wireless communication medium) by the set of assemblies 124 in the facility over the length of each period, so as to reduce the number of assemblies simultaneously engaged in transmission of captured images.

For example, at block 210 the controller 136 can retrieve the above-mentioned period from memory, and also retrieve or determine an expected transmission time required to transmit one image (e.g. five seconds). The controller 136 can then determine a total number of available windows, e.g., by dividing the capture period by the transmission time. For example, with a capture period of six hours and a transmission time of five seconds, the number of available transmission windows is four thousand, three hundred and twenty. As will be apparent to those skilled in the art, the number of available transmission windows may vary greatly depending on the capture period and the expected transmission time. In some examples, the number of available windows can simply be preconfigured, e.g., as a stored value in the controller 136.

The controller 136 can then be configured to select one of the above-mentioned windows. The selection can be made according to any suitable random or pseudo-random process. For example, the controller 136 can be configured to retrieve a previously captured image, or capture an image via control of the camera 132, and derive a cyclic redundancy check (CRC) value (e.g. a 16-bit value) from the image. The controller 136 can then select one of the above windows using the CRC value, e.g., via a modular arithmetic operation. A wide variety of other mechanisms can also be used to select a transmission window. For example, the controller 136 can employ a linear-feedback shift register initialized with previously captured image data, a cryptographic hash function, or the like, to select a transmission window. In general, the pseudo-random selection of transmission windows by each assembly 124 results in distribution of image transmission attempts over the capture period. Although some transmission windows may be selected by multiple assemblies 124, the number of assemblies 124 attempting to transmit images within the same transmission window may be sufficiently small as to mitigate network congestion. As will be apparent, congestion management mechanisms may also be implemented by network resources in the facility (e.g., Wi-Fi access points), above and beyond the transmission window selection process mentioned above.

The transmission window obtained at block 210, in other words, indicates which portion of each capture period the assembly 124 will capture and transmit an image. For instance, if the capture period is six hours, and is divided into four thousand three hundred and twenty windows as mentioned above, the transmission window obtained at block 210 can be an integer indicating which five-second window the assembly 124 will use to capture and transmit an image. For example, the transmission window identifier "10" indicates that the assembly 124 will capture and transmit an image fifty seconds into each six-hour period.

The transmission window identifier obtained at block 210 can be stored in a memory accessible by the controller 136 for later use. In some examples, the transmission window is generated once and stored for repeated later use. In other examples, a new transmission window is selected for each capture operation.

As will be seen below, the controller 136 remains in the low-power state until a data capture initiation condition is detected, such as the arrival of the transmission window obtained at block 210. Prior to arrival of the transmission window (or detection of other data capture initiation conditions), in some examples the controller 136 can be configured, at block 215, to monitor data generated by the motion sensor 144. In particular, the controller 136 and/or the motion sensor 144, even when in the low-power state, can determine whether motion sensor data indicates a physical excursion, e.g. an impact or other movement of the housing 130. When the housing 130 is moved, bumped, or the like, the location and orientation of the assembly 124 stored at the server 128 may no longer be accurate, potentially compromising item status data derived by the server 128 from images captured by the assembly 124. The performance of block 215 enables the controller 136 to detect such conditions and alert the server 128.

At block 215, therefore, the controller 136 and/or the motion sensor 144 can determine whether any accelerations exceeding a configurable threshold have been detected, and/or whether the above-mentioned mercury switches have been triggered. When such events occur, the controller 136 can be configured to log an excursion event, e.g. indicating the observed accelerations, switch triggers, or the like, along with the time at which the event occurred. The controller 136 can briefly switch to a higher power state to write log data to memory.

At block 220, the controller 136 is configured, as mentioned above, to determine whether a data capture initiation condition is satisfied. In some examples, the determination at block 220 includes a determination of whether a current time corresponds to the transmission window obtained at block 210. In other examples, the determination at block 220 can include a determination of whether a charge level in the energy storage device 156 exceeds a predetermined threshold (e.g., if sufficient stored energy is available, the controller 136 may initiate a capture operation earlier than the transmission window in some examples). In further examples, the condition detected at block 220 can include the detection of an RFID interrogation signal from an RFID reader disposed in the facility.

When the determination at block 220 is negative, the controller 136 continues monitoring motion data (if the motion sensor 144 is present), while the energy collector 152 continues to charge the energy storage device 156. When the determination at block 220 is affirmative, the controller 136 proceeds to block 225.

At block 225, the controller 136 is configured to enable an active power state, e.g., the second, higher-power state mentioned above. Following the switch to the active power state, the controller 136 is configured to initiate an image capture operation. In some examples, however, prior to initiating the data capture operation, the controller 136 can be configured to determine whether the FOV of the camera 132 is obstructed.

Specifically, at block 230, the controller 136 can be configured (in embodiments in which the assembly 124 includes the depth sensor 148) to obtain a range measurement from the depth sensor 148. The controller 136 is then configured to determine whether the range measurement exceeds a configurable threshold that corresponds to the expected distance between the camera 132 and the module 104 across the aisle 112 from the camera 132. As will now be apparent, if a customer or other obstacle is between the camera 132 and the opposite module 104, a captured image may simply depict the obstacle, rather than the opposing module 104 and the items 108 thereon. The determination at block 230 enables the controller 136 to avoid wasting stored energy to capture such an image.

Figure 3:
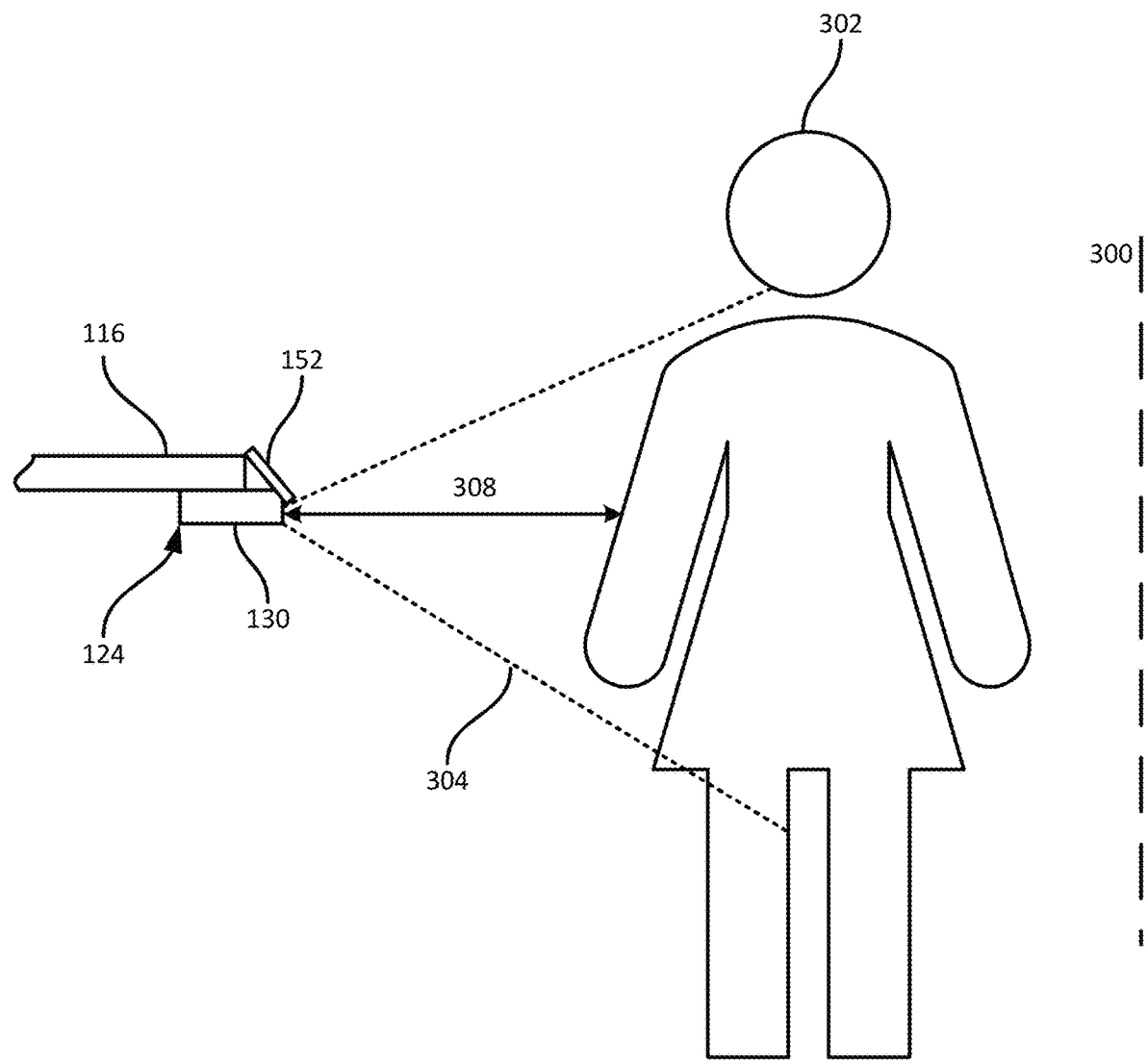
FIG. 3. is a diagram illustrating an example performance of block 230 of the method of FIG. 2.

Turning to FIG. 3, an assembly 124 is shown on a partial support surface 116, with a boundary 300 indicating an expected distance between the camera of the assembly 124 and the forward surface of the opposing module 104. As seen in FIG. 3, a person 302 is inside the FOV 304 of the camera 132, and therefore obstructs the view of the opposing module 104 by the camera 132. At block 230, the controller 136 obtains a range measurement 308 and compares the range measurement 308 to a threshold, e.g., the distance between the assembly and the boundary 300. When the range measurement is smaller than the threshold, as is the case in FIG. 3, the determination at block 230 is negative, and the controller 136 proceeds to block 235.

At block 235, the controller 136 increments the transmission window. For example, the controller 136 can increment the transmission window by an amount of time smaller than the capture period (e.g. six hours, as mentioned earlier). For example, the controller 136 can increment the transmission window by thirty seconds (e.g., six transmission window identifiers). The controller 136 then repeats the determination at block 220. As a result, the expenditure of stored energy associated with image capture and transmission can be avoided in situations where the captured image would depict only an obstacle, rather than the module opposite the assembly 124.

When the determination at block 230 is affirmative, or when blocks 230 and 235 are omitted, the controller 136 proceeds to block 240. At block 240, the controller 136 is configured to control the camera 132 to capture an image (e.g., of the opposing module 104 and any items 108 supported thereon).

In some examples, the assemblies 124 can include features enabling the server 128 to detect the assemblies 124 in images captured by other assemblies 124. That is, given that assemblies 124 can be deployed on modules 104 on both sides of an aisle, each image captured by a given assembly 124 may depict one or more assemblies on the opposite module 104. The assemblies 124 can include features enabling the server 128 to detect the assemblies 124 in captured images, e.g., to determine the three-dimensional positions of the assemblies 124 and determine whether any assemblies have been moved.

Figure 4:
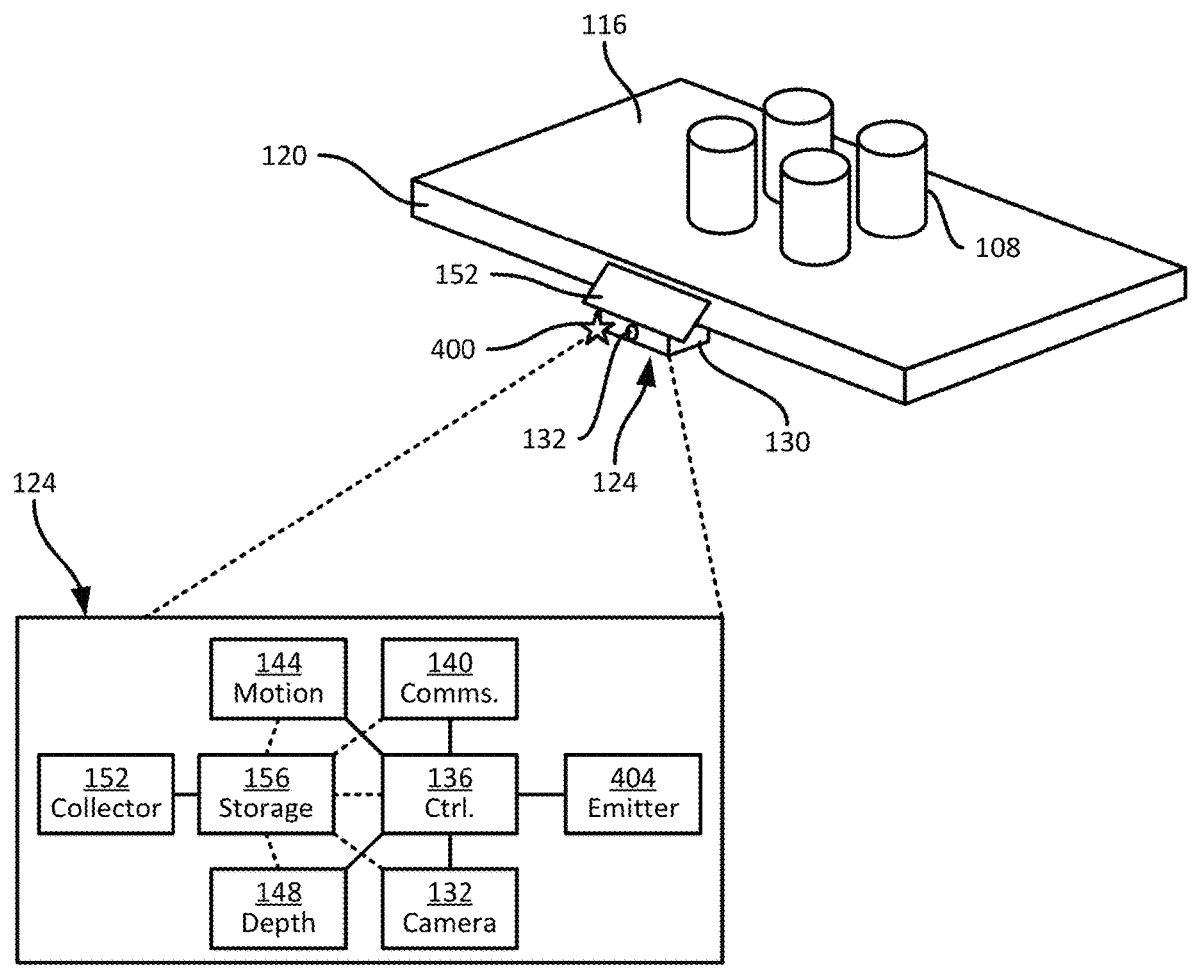
FIG. 4 is a diagram of an example camera assembly.

In particular, referring to FIG. 4, in some examples each assembly 124 can include a fiducial marker (e.g. a retroreflective marker or the like) 400 disposed on the housing 130. The assembly 124 can also include an emitter 404 such as an infrared LED. At block 240, the controller 136 of each assembly 124 can be configured not only to control the camera 132 to capture an image, but also to enable the emitter 404, to illuminate any markers 400 on the opposite side of the aisle 112. As a result of such illumination, the markers 400 of opposing assemblies 124 may appear as bright spots in the captured image, and may therefore be readily detectable by the server 128.

Having captured and stored an image at block 240, the controller 136 is configured to transmit the image for receipt and processing by the server 128. In some examples, in which the motion sensor 144 is employed to monitor for impacts and other excursions, prior to sending the image, the controller 136 is configured, at block 245, to determine whether any such excursions were logged as a result of the performance of block 215. When the determination at block 245 is affirmative, at block 250 the controller 136 is configured to generate an alert, e.g. including motion sensor data and a timestamp corresponding to the detected excursion.

When the determination at block 245 is negative, or following the performance of block 250, at block 255 the controller 136 is configured to transmit the captured image and, if applicable, the alert from block 250, to the server 128 via the communications interface 140. Various transmission mechanisms can be employed at block 255. In some examples, the interface 140 can establish a link with an access point (e.g. a Wi-Fi access point) and transmit the image directly to the server 128. In other examples, the interface 140 can establish a connection with a Bluetooth hub (or other short-range access point), which in turn can relay the data to the server 128 via a Wi-Fi network. In further examples, transmission at block 255 can be initiated by an RFID reader, e.g. under control of the server 128. In particular, the RFID reader can interrogate the assembly 124, which can then backscatter the image data (and the alert from block 250, if applicable) for receipt by the RFID reader. In some examples, the RFID reader can also enable the collector (e.g., in the form of an RFID antenna) to charge the energy storage device 156 by emitting beam-steered RF energy towards the communications interface 140.

The above-mentioned access points, hubs, RFID readers and the like, can be deployed in fixed positions within the facility, or can be mobile, e.g., affixed to an autonomous or semi-autonomous apparatus configured to traverse the facility to collect images captured by the assemblies 124 for subsequent provision to the server 128. Following block 255, the controller 136 is configured to return to block 205 as described above.

As will now be apparent, the server 128 can execute various processes using the images collected from the assemblies 124 disposed in the facility. For example, having received the images, the server 128 can be configured to register the images to a common frame of reference using calibration data (e.g. specifying the positions and orientations of the assemblies 124 in the coordinate system 129), to form a composite image from which items 108 can be detected and item status information can be derived.

The server 128 can also assess excursion data, e.g. from the alert generated at block 250, and/or detect the position of an assembly 124 in a captured image from the above-mentioned markers, to determine whether repositioning and/or recalibration of the relevant assembly 124 is required. The server 128 can generate notifications to staff in the facility in response to determining the need for such recalibration or other corrective actions.

Figure 5:
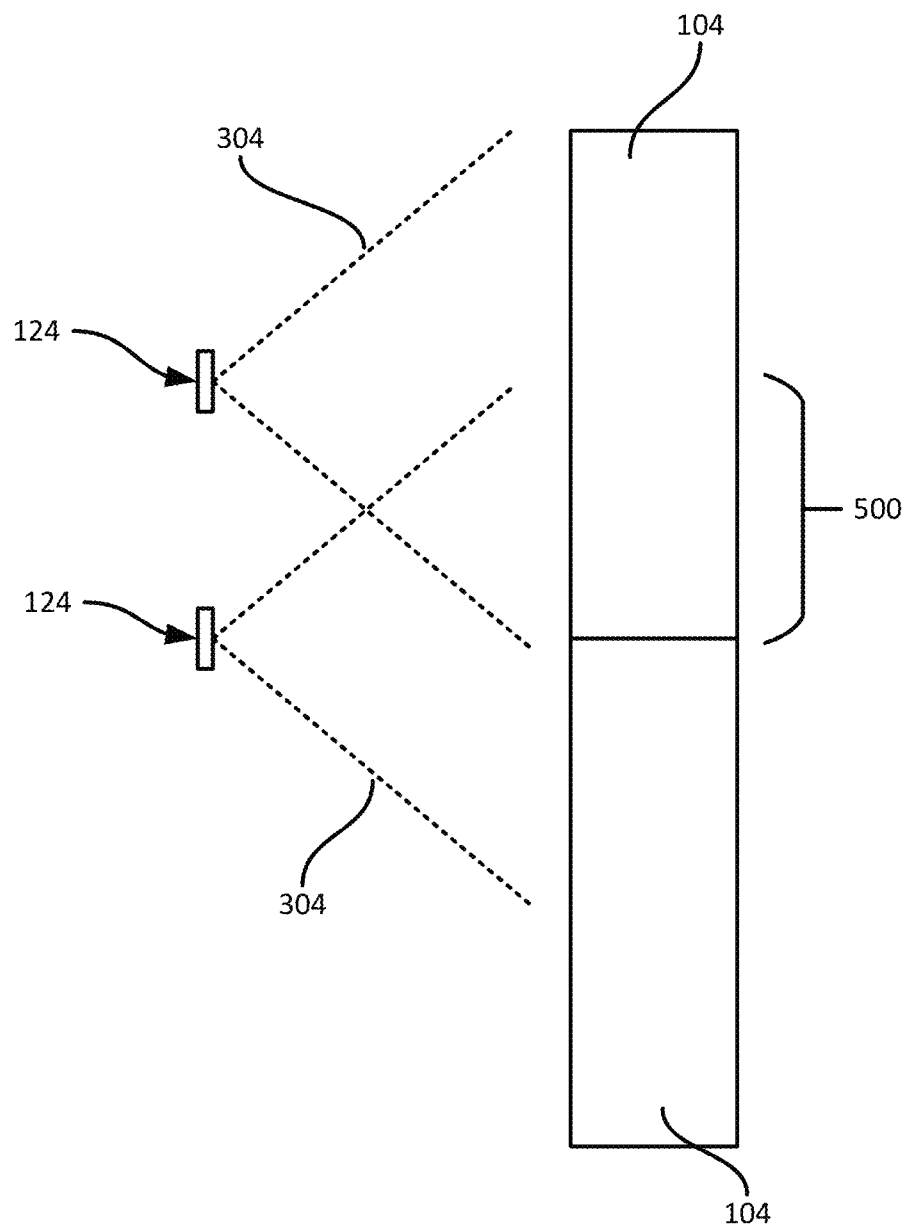
FIG. 5 is a diagram of an example arrangement of camera assemblies in the system of FIG. 1

In some examples, the assemblies 124 are disposed so as to enable the server 128 to determine depth data from combinations of captured images. For example, FIG. 5 illustrates an overhead view of two modules 104, with assemblies 124 disposed opposite the modules 104 (e.g. on other modules 104, not shown) and having FOVs 304 encompassing portions of the modules 104. In particular, at least a portion 500 of a module 104 is encompassed within the FOVs 304 of both assemblies 124. Given that the assemblies 124 are separated, and that the separation distance is known by the server 128, the assemblies 124 effectively act as a stereo camera, enabling the server 128 to determine three-dimensional positions of features in the captured images. As will be apparent, the system 100 can include a sufficient number of assemblies 124 to encompass each module 104 in overlapping portions of at least two FOVs 304.

Figure 6A:
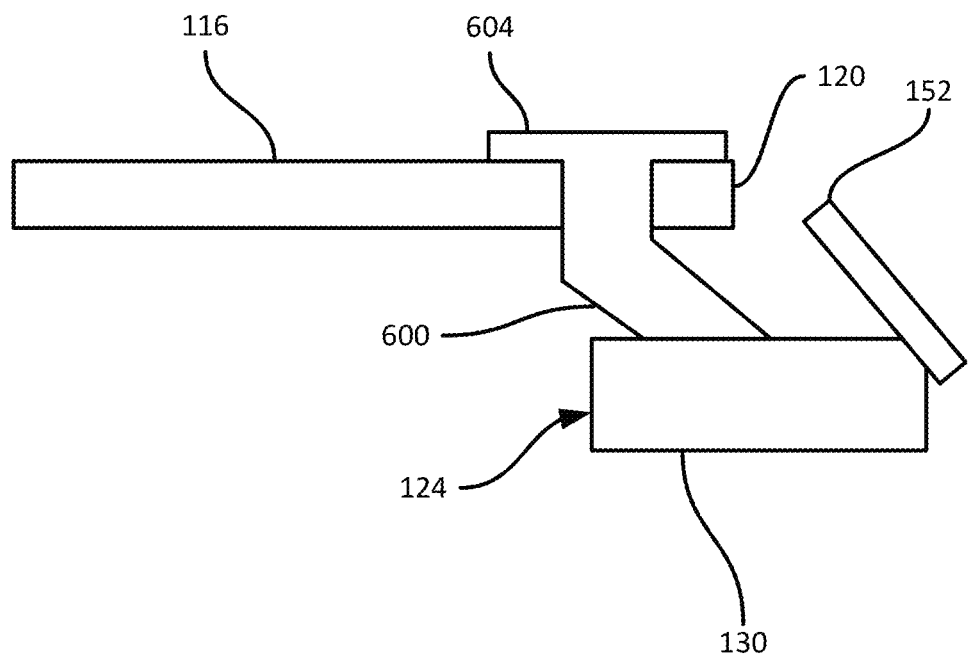
FIG. 6A is a diagram illustrating an example mounting mechanism for a camera assembly.
Figure 6B:
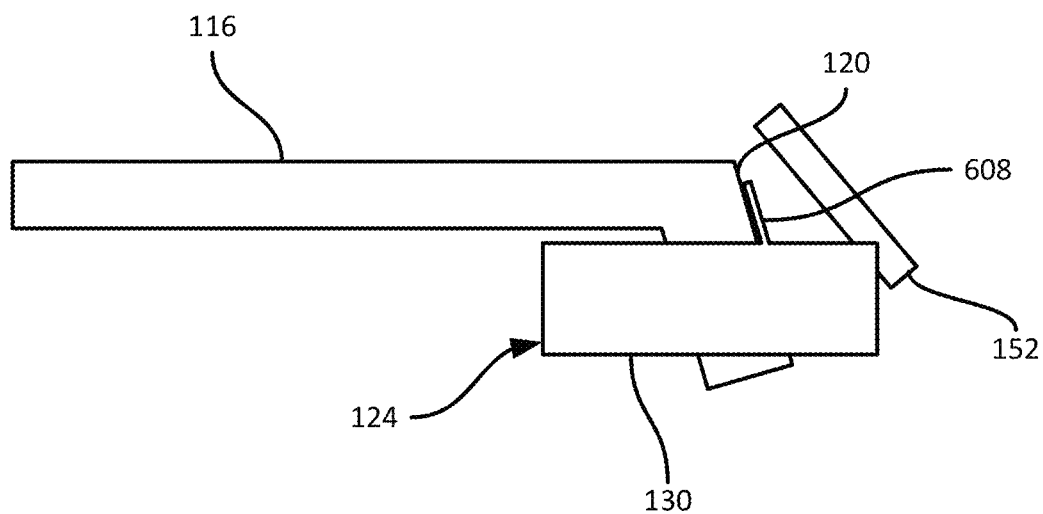
FIG. 6B is a diagram illustrating another example mounting mechanism for a camera assembly Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

As noted earlier the housing 130 of the assembly 124 can be coupled to a support surface 116. Turning to FIGS. 6A and 6B, two example mechanisms for coupling the assembly 124 to a support surface 116 are shown. In FIG. 6A, the housing 130 is affixed to a coupling member such as an arm 600 extending through an opening in the support surface 116 (either prefabricated, or made though the support surface 116 at the time of installation of the assembly 124). The arm 600 can be coupled to one or more flanges, tabs 604 or the like to retain the arm 600 within the opening.

In other examples, as shown in FIG. 6B, the housing 130 can include a coupling member in the form of a flange 608. The housing 130 can be inserted through an opening in the shelf edge 120, and the flange 608 can engage with the shelf edge 120 when the housing 130 is inserted into the above opening, e.g., to affix the flange 608 (and therefore the housing 130 as a whole) to the shelf edge 120.

Further variations to the above assemblies and methods are also contemplated. In some implementations, the controller 136 can be configured to detect a data capture initiation condition at block 220 as discussed above, and to subsequently detect a transmit condition prior to performing block 245. That is, image capture can be initiated in response to any of the above conditions (e.g., charge level in the energy storage device 156, scheduled image capture times, transmission windows, or the like). Following image capture at block 240, the controller 136 can return the assembly 124 to a low-power state, and can be configured to monitor for the transmit condition before returning to a higher-power state to transmit the image. This implementation enables a set of assemblies 124 to capture images at substantially the same time (e.g., according to a preconfigured schedule), but to then stagger the transmission of such images according to the transmission windows discussed above. Other transmit conditions include RFID interrogation signals, charge level thresholds in the energy storage device 156, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A camera assembly, comprising:
   a camera having a field of view (FOV);
   an energy storage device;
   an energy collector, configured to charge the energy storage device;
   a wireless communications interface;
   a controller configured to:
      (i) detect a capture initiation condition;
      (ii) in response to detecting the capture initiation condition, control the camera to capture an image; and
      (iii) control the wireless communications interface to transmit the image; and
   a housing supporting the camera, the energy storage device, the energy collector, the wireless communications interface, and the controller;
   wherein the housing is configured for coupling to a first support structure to direct the FOV of the camera towards a second support structure supporting a plurality of items;
   wherein the controller is configured to detect the capture initiation condition by:
      selecting one of a plurality of transmission windows; and
      determining that a current time corresponds to the selected transmission window;
   wherein the controller is configured to select the transmission window by:
      capturing an initial image;
      determining a cyclic redundancy check (CRC) value from the initial image; and
      selecting the transmission window based on the CRC value.

2. The camera assembly of claim 1, wherein the controller is configured to enter a high-power state in response to controlling the wireless communications interface to transmit the image.

3. The camera assembly of claim 2, wherein the controller is configured to monitor for the capture initiation condition in the low-power state, and to activate a second power state in response to detecting the capture initiation condition.

4. The camera assembly of claim 1, wherein the controller is configured to detect the capture initiation condition by at least one of:
   (i) detecting a wireless interrogation signal, and
   (ii) determining that a charge level of the energy storage device exceeds a threshold.

5. The camera assembly of claim 1, wherein the controller is further configured, prior to controlling the wireless communications interface to transmit the image, to detect a transmit condition.

6. The camera assembly of claim 1, wherein the energy storage device includes a supercapacitor; and
   wherein the energy collector includes at least one (i) of a photovoltaic panel, and (ii) a radio frequency identification (RFID) antenna.

7. The camera assembly of claim 1, further comprising a motion sensor;
   wherein the controller is further configured to:
      monitor the motion sensor for an excursion; and
      in response to detecting an excursion, transmit an alert with the image.

8. The camera assembly of claim 1, further comprising a depth sensor;
   wherein the controller is further configured to:
      in response to detecting the capture initiation condition, and prior to capturing the image, control the depth sensor to obtain a range measurement; and
      determine that the range measurement exceeds a threshold.

9. The camera assembly of claim 1, wherein the housing includes a body supporting at least the camera, the energy storage device, and the controller; and a coupling member extending from the body to engage with the support structure.

10. A method in a camera assembly, comprising:
   generating electrical power via an energy collector of the camera assembly;
   charging an energy storage device of the camera assembly with the electrical power;
   a wireless communications interface;
   at a controller of the camera assembly:
      detecting a capture initiation condition;
      in response to detecting the capture initiation condition, controlling a camera of the camera assembly to capture an image;
      control a wireless communications interface of the assembly to transmit the image;
   wherein detecting the capture initiation condition includes:
      selecting one of a plurality of transmission windows; and
      determining that a current time corresponds to the selected transmission window;
   wherein selecting the transmission window includes:
      capturing an initial image;

determining a cyclic redundancy check (CRC) value from the initial image; and selecting the transmission window based on the CRC value.

11. The method of claim 10, further comprising entering a high-power state in response to controlling the wireless communications interface to transmit the image.

12. The method of claim 11, further comprising monitoring for the capture initiation condition in the low-power state, and activating a second power state in response to detecting the capture initiation condition.

13. The method of claim 10, further comprising: prior to controlling the wireless communications interface to transmit the image, detecting a transmit condition.

14. The method of claim 10, wherein detecting the capture initiation condition includes at least one of:

(i) detecting a wireless interrogation signal, and (ii) determining that a charge level of the energy storage device exceeds a threshold.

15. The method of claim 10, wherein the energy storage device includes a supercapacitor; and wherein the energy collector includes at least one (i) of a photovoltaic panel, and (ii) a radio frequency identification (RFID) antenna.

16. The method of claim 10, further comprising:

monitoring a motion sensor for an excursion; and in response to detecting an excursion, transmitting an alert with the image.

17. The method of claim 10, further comprising;

in response to detecting the capture initiation condition, and prior to capturing the image, controlling a depth sensor to obtain a range measurement; and determining that the range measurement exceeds a threshold.

* * * * *